United States Patent
Zhang et al.

(10) Patent No.: US 10,235,603 B2
(45) Date of Patent: Mar. 19, 2019

(54) METHOD, DEVICE AND COMPUTER-READABLE MEDIUM FOR SENSITIVE PICTURE RECOGNITION

(71) Applicant: Xiaomi Inc., Beijing (CN)

(72) Inventors: Tao Zhang, Beijing (CN); Fei Long, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/207,070

(22) Filed: Jul. 11, 2016

(65) Prior Publication Data

US 2017/0032224 A1    Feb. 2, 2017

(30) Foreign Application Priority Data

Jul. 31, 2015   (CN) .......................... 2015 1 0463265

(51) Int. Cl.
*G06K 9/00* (2006.01)
*G06K 9/46* (2006.01)
*G06K 9/62* (2006.01)
*G06T 3/40* (2006.01)
*G06T 7/90* (2017.01)
(Continued)

(52) U.S. Cl.
CPC .......... *G06K 9/6268* (2013.01); *G06F 21/64* (2013.01); *G06K 9/00684* (2013.01); *G06K 9/4671* (2013.01); *G06N 99/005* (2013.01); *G06T 3/40* (2013.01); *G06T 7/90* (2017.01);
(Continued)

(58) Field of Classification Search
None
See application file for complete search history.

(56) References Cited

U.S. PATENT DOCUMENTS 8,385,632 B2  2/2013  Porikli
8,406,482 B1  3/2013  Chien et al.
(Continued)

FOREIGN PATENT DOCUMENTS

CN   101359372 A   2/2009
CN   103164687 A   6/2013
(Continued)

OTHER PUBLICATIONS

Wang, Yushi, Weigiang Wang, and Wen Gao. "Research on the discrimination of pornographic and bikini images." Multimedia, Seventh IEEE International Symposium on. IEEE, 2005.*
(Continued)

*Primary Examiner* — Sumati Lefkowitz
*Assistant Examiner* — David Perlman
(74) *Attorney, Agent, or Firm* — Oblon, McClelland, Maier & Neustadt, L.L.P.

(57) ABSTRACT

Method, device and computer-readable medium for sensitive picture recognition are provided in the disclosure. Aspects of the disclosure provide a method for sensitive picture recognition. The method includes receiving a picture to be processed from a picture library associated with a user account, applying a sensitive picture recognition model to the picture to determine whether the picture is a sensitive picture or not, and providing a privacy protection associated with the user account to the picture when the picture is the sensitive picture. In an example, the method includes storing the picture in a private album under the user account with access security protection.

14 Claims, 9 Drawing Sheets

(51) Int. Cl.
  *G06F 21/64* (2013.01)
  *G06N 99/00* (2010.01)
(52) U.S. Cl.
  CPC .............. *G06T 2207/10024* (2013.01); *G06T 2207/20084* (2013.01); *G06T 2207/30196* (2013.01)

(56) References Cited

U.S. PATENT DOCUMENTS

| | | | | |
|---|---|---|---|---|
| 2003/0225763 | A1* | 12/2003 | Guilak | G06F 17/30707 |
| 2005/0089216 | A1* | 4/2005 | Schiller | G06K 9/342 |
| | | | | 382/159 |
| 2006/0020714 | A1* | 1/2006 | Girouard | G06F 17/30905 |
| | | | | 709/246 |
| 2006/0072815 | A1* | 4/2006 | Wu | G06K 9/0061 |
| | | | | 382/167 |
| 2008/0159627 | A1 | 7/2008 | Sengamedu | |
| 2008/0212892 | A1* | 9/2008 | Doida | G06T 5/009 |
| | | | | 382/274 |
| 2010/0310158 | A1 | 12/2010 | Fu et al. | |
| 2013/0170738 | A1* | 7/2013 | Capuozzo | G06F 17/30265 |
| | | | | 382/159 |
| 2014/0198982 | A1* | 7/2014 | Dinerstein | G06K 9/00234 |
| | | | | 382/165 |
| 2014/0279754 | A1* | 9/2014 | Barsoum | G06N 7/005 |
| | | | | 706/12 |
| 2016/0035078 | A1* | 2/2016 | Lin | G06T 7/0002 |
| | | | | 382/157 |
| 2016/0294755 | A1* | 10/2016 | Prabhu | H04L 51/12 |

FOREIGN PATENT DOCUMENTS

| | | |
|---|---|---|
| CN | 104021350 A | 9/2014 |
| CN | 104021350 A | 9/2014 |
| CN | 104182735 A | 12/2014 |
| CN | 104281833 A | 1/2015 |
| CN | 104462900 A | 3/2015 |
| CN | 104484683 A | 4/2015 |
| CN | 105095911 A | 11/2015 |
| JP | 9-147119 A | 6/1997 |
| JP | 2005-208850 A | 8/2005 |
| JP | 2013-191035 A | 9/2013 |
| JP | 2014-41587 A | 3/2014 |
| JP | 2015-69580 A | 4/2015 |

OTHER PUBLICATIONS

Office Action dated Mar. 22, 2017 in Korean Patent Application No. 10-2016-7005307 (with English Translation).

Office Action dated Mar. 2, 2017 in Russian Patent Application No. 2016108022 (with Partial English Translation).

Sergej Zerr et al., "PicAlert!: A System for Privacy-Aware Image Classification and Retrieval", Proceedings of the 21th ACM International Conference on Information and Knowledge Management, CIKM'12, Oct. 29, 2012, pp. 2710-2712.

Holger Schwenk et al., "Boosting Neural Networks", Neural Computation, Massachusetts Institute of Technology, vol. 12, No. 8, Aug. 2000, pp. 1-19.

Extended European Search Report dated Dec. 5, 2016 in Patent Application No. 16179991.1.

David Lorenzi, et al., "Identifying a Critical Threat to Privacy through Automatic Image Classification" Proceedings of the First ACM Conference on Data and Application Security and Privacy, vol. 23, XP055323205, Feb. 21-23, 2011, pp. 157-167.

Sergej Zerr, et al., "PicAlert!: A System for Privacy-Aware Image Classification and Retrieval" Proceedings of the $21^{st}$ ACM International Conference on Information and Knowledge Management, XP055323210, Oct. 29, 2012, 4 Pages.

Mahmoud A. Mofaddel, et al., "Adult Image Content Filtering: A Statistical Method Based on Multi-Color Skin Modeling" Signal Processing and Information Technology (ISSPIT), XP031912878, Dec. 15, 2010, pp. 366-370.

International Search Report dated Apr. 27, 2016 in WIPO Patent Application No. PCT/CN2015/099292.

Japanese Office Action dated Nov. 21, 2017 in Patent Application No. 2017-531956.

Korean Office Action dated Sep. 28, 2017 in Patent Application No. 10-2016-7005307 (with English translation).

Minori Ohgoda, et al., "A Clustering Method for Gene Expression Data Based or COG Classification" IEICE Technical Report, vol. 115, No. 111, Jun. 16, 2015, pp. 121-126 and Cover Pages.

Japanese Office Action dated Sep. 21, 2017 in Patent Application No. 2017-531956.

Combined Office Action and Search Report dated Dec. 18, 2017 in Chinese Patent Application No. 201510463265.X, 10 pages.

Combined Office Action and Search Report dated Aug. 3, 2018 in Chinese Patent Application No. 201510463265.X, 7 pages.

* cited by examiner

METHOD, DEVICE AND COMPUTER-READABLE MEDIUM FOR SENSITIVE PICTURE RECOGNITION

CROSS-REFERENCE TO RELATED APPLICATION

This application claims priority to Chinese Patent Application No. 201510463265.X, filed on Jul. 31, 2015, which is incorporated herein by reference in its entirety.

FIELD

The present disclosure generally relates to the field of communication technology, and more particularly, to method, device and computer-readable medium for sensitive picture recognition.

BACKGROUND

Currently, with the increasing popularity of smart phones, it is becoming more and more prevalent to use a phone to take pictures. More particular, certain phone users like to take self-portrait pictures and some of these self-portrait pictures are erotic pictures. As a result, there exist many sensitive pictures in the phone's picture library.

In related art, in order to protect privacy and avoid unsolicited release of the sensitive pictures, the phone users usually need to manually move these sensitive pictures into private albums, which would be hidden and encrypted.

SUMMARY

A method, device and server for sensitive picture recognition are provided in the disclosure. The illustrated embodiments are explained as below.

Aspects of the disclosure provide a method for sensitive picture recognition. The method includes receiving a picture to be processed from a picture library associated with a user account, applying a sensitive picture recognition model to the picture to determine whether the picture is a sensitive picture or not, and providing a privacy protection associated with the user account to the picture when the picture is the sensitive picture. In an example, the method includes storing the picture in a private album under the user account with access security protection.

According to an aspect of the disclosure, the method includes receiving a training sample set, the training sample set containing a first class of training pictures and a second class of training pictures. The first class of training pictures are sensitive pictures which include sensitive contents, the second class of training pictures are non-sensitive pictures which do not include sensitive contents. Further, the method includes initializing a training model with multiple layers according to a neural network. Each layer includes neuron nodes with feature coefficients between the neuron nodes. The method then includes training the feature coefficients between the neuron nodes in each layer of the training model using the first class of training pictures and the second class of training pictures to determine a trained model for sensitive picture recognition.

In addition, in an example, the method includes receiving a test sample set, the test sample set containing a first class of test pictures and a second class of test pictures. The first class of test pictures are sensitive pictures which include sensitive contents, and the second class of test pictures are non-sensitive pictures which do not include sensitive contents. The method includes applying the trained model to each of the first class of test pictures and the second class of test pictures in the test sample set respectively, to obtain classification results corresponding to each of the test pictures, and determining a classification accuracy rate of the trained model, based on the classification results corresponding to each of the test pictures.

Further, in an example, the method includes updating the training sample set, training the feature coefficients between the neuron nodes in each layer of the trained model using the updated training, sample set to update the trained model, updating the test sample set, and testing the updated trained model based on the updated test sample set to determine an updated classification accuracy rate.

According to an aspect of the disclosure, the method includes iteratively updating the trained model when the classification accuracy rate is smaller than the predefined threshold until a maximum iteration number is satisfied, selecting a maximum classification accuracy rate among the classification accuracy rates corresponding to each of the iterations and determining the updated trained model corresponding to the maximum classification accuracy rate as the sensitive picture recognition model.

In an example, the method includes normalizing the picture to have a predefined size, and applying the sensitive picture recognition model to the normalized picture to determine whether the picture is the sensitive picture or not.

Further, in another example, the method includes detecting a portion of the picture that corresponds to human skin, cropping the picture to obtain an image of the portion, normalizing the image of the portion to have a predefined size, and applying the sensitive picture recognition model to the normalized image of the portion to determine whether the picture is the sensitive picture or not.

To detect the portion of the picture that corresponds to human skin, in an example, the method includes applying a skin color model to the picture, to decide whether the picture contains regions of skin. The skin color model defines a skin color space in which a ratio of R channel to G channel is larger than a predefined ratio. Further, the method includes determining, when the picture contains the regions of skin, whether the regions of skin are connectible, based on positions of the regions, and when two regions of skin are connectible, connecting the two regions to form a combined region.

Further, according to an aspect of the disclosure, the method includes normalizing the first class of training pictures and the second class of training pictures to have a predefined size respectively, and training the feature coefficients between the neuron nodes in each layer of the training model using the normalized first class of training pictures and the normalized second class of training pictures to determine the trained model for sensitive picture recognition.

To normalize the first class of training pictures and the second class of training pictures to have the predefined size respectively, in an example, the method includes receiving information indicative of sensitive regions in each picture of the first class of training pictures in the training sample set, the sensitive regions being under privacy protection, cropping the first class of training pictures in accordance with the sensitive regions, to have images of sensitive regions, and normalizing the images of sensitive regions and the second class of training pictures to have the predefined size.

Aspects of the disclosure provide a device for sensitive picture recognition. The device includes a processor, and a memory for storing instructions executable by the processor.

The processor is configured to receive a picture to be processed from a picture library associated with a user account, apply a sensitive picture recognition model to the picture to determine whether the picture is a sensitive picture or not, and provide a privacy protection associated with the user account to the picture when the picture is the sensitive picture.

Aspects of the disclosure provide a non-transitory computer-readable storage medium having stored therein instructions that, when executed by a processor of a device, cause the device to perform operations for sensitive picture recognition. The operations include receiving a picture to be processed from a picture library associated with a user account, applying a sensitive picture recognition model to the picture to determine whether the picture is a sensitive picture or not, and providing a privacy protection associated with the user account to the picture when the picture is the sensitive picture.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

The above figures have illustrated specific embodiments of the disclosure, which will be elaborated in more detail below. These figures and literary description are not intended to limit the scope of the disclosure in any manner, rather than just describe the concept of the disclosure to those skilled in the art by referring to the specific embodiments.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

Figure 1:
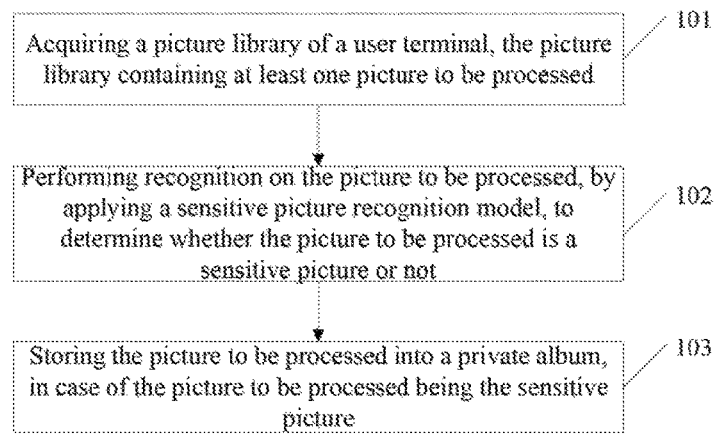
FIG. 1 is a flow diagram illustrating a method for sensitive picture recognition according to an exemplary embodiment.

FIG. 1 is a flow diagram illustrating a method for sensitive picture recognition according to an exemplary embodiment, which may be performed by a sensitive picture recognition device. The sensitive picture recognition device, for example, may be a server corresponding to smart terminals such as telephone terminal, PAD, etc., or software installed on the server. The sensitive picture recognition device may also be a smart terminal such as telephone terminal, PAD, etc., or an application (app) installed on the smart terminal. The method for sensitive picture recognition as illustrated in the exemplary embodiment, may include the following several steps.

In step 101, a picture library of a user terminal is acquired, the picture library containing at least one picture to be processed.

In this embodiment, before a server acquires the picture library of the user terminal, the user terminal may manually or automatically update or upload pictures in the picture library to a cloud server.

In step 102, a sensitive picture recognition model is applied to perform recognition on the picture to be processed, to determine whether the picture to be processed is a sensitive picture or not.

Figure 2:
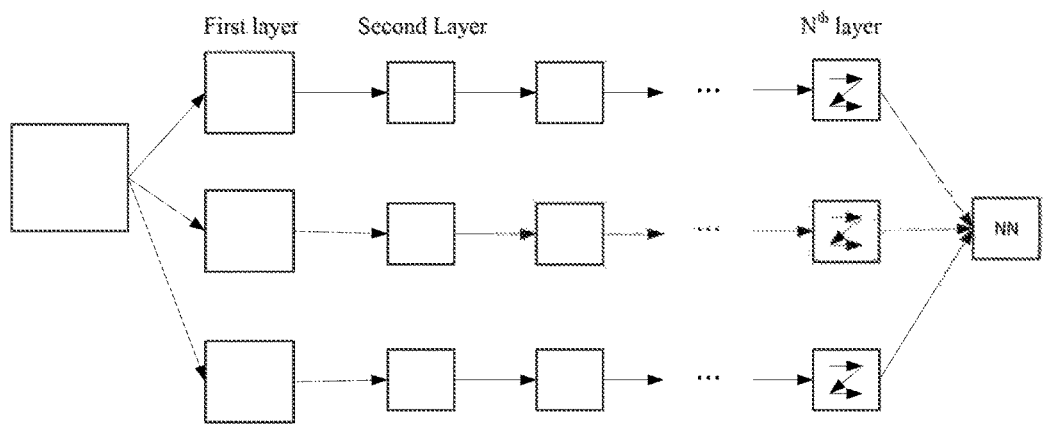
FIG. 2 is a network structure of an example convolutional neural network.

In this example embodiment, the convolutional neural network is utilized to establish the sensitive picture recognition model. The convolutional neural network, as one kind of a variety of artificial neural networks, has become a hot area in current field of voice analysis and image recognition. Shared weights in the structure of the convolutional neural network make it more likely to be a biological neural network, reduce the complexity of the network model, and have a decreased number of weights. This advantage will be more outstanding when an input of the network is a multi-dimensional image. By taking the image as a direct input of the network, it may avoid complex feature extraction and data reconstruction processes as happened in traditional recognition algorithms A network structure of a convolutional neural network is shown in FIG. 2. The convolutional neural network is a multilayer neural network, in which each layer is consisted of multiple two-dimensional planes, and each plane is consisted of multiple independent neurons. In an exemplary implementation, suppose that a convolutional neural network based sensitive picture recognition model may have a N-layer structure, in which weight coefficients of connections between hidden layer nodes in every two adjacent layers are determined by a training sample set. For ease of illustration, the weight coefficients of the connections between hidden layer nodes are called as "feature coefficients" in the present disclosure. That is to say, the sensitive picture recognition model has feature coefficients of N layers.

In this embodiment, the input of the sensitive picture recognition model is a picture to be processed, and its output may be an attribution classification result of the picture to be processed. The attribution of the picture to be processed may include: sensitive and non-sensitive. By inputting the picture to be processed into the sensitive picture recognition model, based on the attribute classification result outputted for the picture to be processed, it may be determined that whether the picture to be processed is a sensitive picture or not.

In step 103, in case of the picture to be processed being the sensitive picture, the picture to be processed is stored into a private album.

More particular, the private album is an album specifically used for storing sensitive pictures. This album may be encrypted or be configured to be in a hidden status, to prevent accesses by other users and avoid any leakage of user privacy.

In the present embodiment, the picture to be processed is not limited to pictures contained in the picture library of the user terminal, and it may also be pictures acquired by other approaches or from other sources. The approaches by which the pictures are acquired are not limited herein, and the approaches may be configured as required.

In the present embodiment, by applying the sensitive picture recognition model to perform recognition on the picture to be processed so as to determine whether the picture to be processed is a sensitive picture or not, and storing the picture to be processed into the private album in case of the picture to be processed being the sensitive picture, the picture to be processed in the picture library may be automatically recognized and processed. Accordingly, there is no need for a user to manually select a sensitive picture and move the sensitive picture into the private album. As a result, both time and labor are saved; the efficiency of sensitive picture recognition may be improved; the privacy protection may be enhanced, and leakage of sensitive picture may be avoided.

Figure 3:
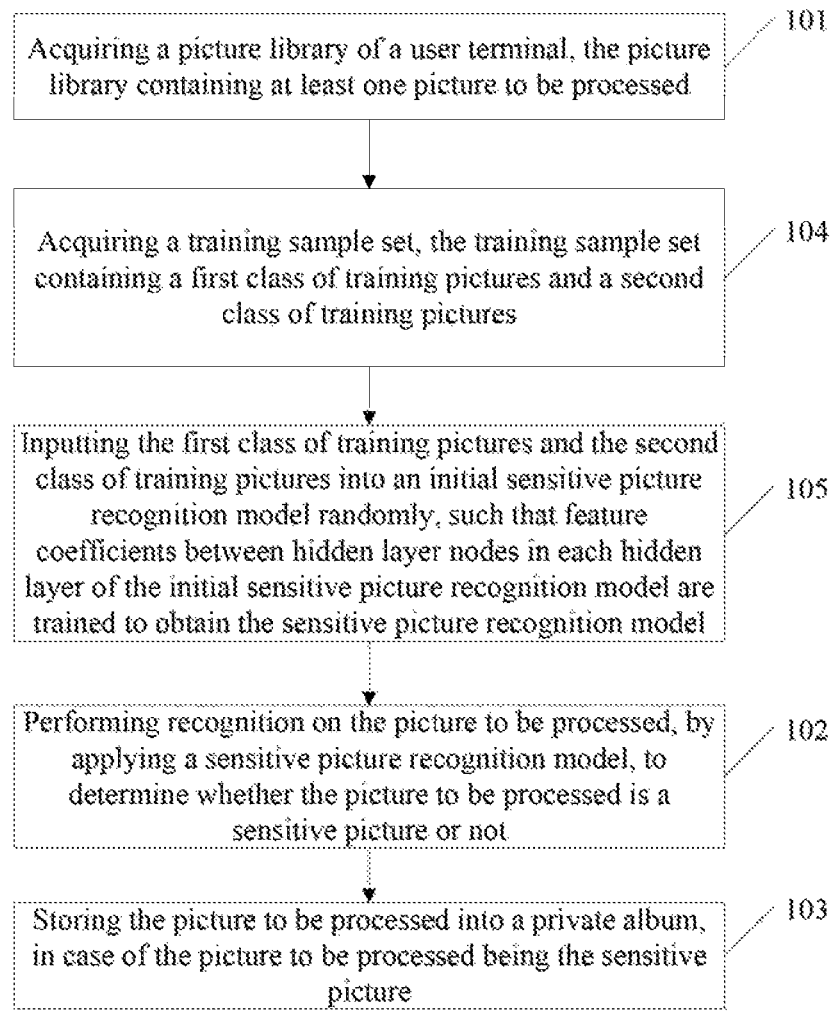
FIG. 3 is a flow diagram illustrating a method for sensitive picture recognition according to another exemplary embodiment.

FIG. 3 is a flow diagram illustrating a method for sensitive picture recognition according to another exemplary embodiment. As shown in FIG. 3, apart from these steps described in FIG. 1, before step 102, the method may further include the following steps.

In step 104, a training sample set is acquired, the training sample set containing a first class of training pictures and a second class of training pictures, the first class of training pictures being sensitive pictures which include private parts, and the second class of training pictures being non-sensitive pictures which do not include private parts.

In an exemplary implementation, the first class of training pictures and the second class of training pictures may be collected by the server. For the purpose of ensuring certain training effects, both a number of the first class of training pictures and a number of the second class of training pictures in the training sample set may be larger than a first predefined number. For example, the number of the first class of training pictures may be 200,000 or more, and the number of the second class of training pictures may be 300,000 or more.

In step 105, the first class of training pictures and the second class of training pictures are randomly inputted into an initial sensitive picture recognition model, such that feature coefficients between hidden layer nodes in each hidden layer of the initial sensitive picture recognition model are trained to obtain the sensitive picture recognition model.

In a possible implementation, the server may randomly input each training picture into the initial sensitive picture recognition model, and compare the attribute classification result outputted by the initial sensitive picture recognition model with the attribute of the inputted training picture to determine whether any feature coefficient between hidden layer nodes in each hidden layer of the current initial sensitive picture recognition model is required to be adjusted. However, this kind of training method may have such a problem: just after a forward adjustment of the feature coefficients between hidden layer nodes in each hidden layer of the initial sensitive picture recognition model according to a former training picture, it is possible to adjust inversely the feature coefficients between hidden layer nodes in each hidden layer of the initial sensitive picture recognition model according to a subsequent training picture. Consequently, the feature coefficients between hidden layer nodes in each hidden layer of the initial sensitive picture recognition model may be frequently and repeatedly adjusted.

Regarding this, in an alternative embodiment, the server may input a batch of training pictures into the initial sensitive picture recognition model in a proper sequence, and then determine whether any feature coefficient between hidden layer nodes in each hidden layer of the current initial sensitive picture recognition model is required to be adjusted, based on the attribute classification results of this batch of training pictures outputted by the initial sensitive picture recognition model. After this, the next batch of training pictures will be inputted into the initial sensitive picture recognition model in a proper sequence.

In this exemplary embodiment, with the steps of acquiring a training sample set, the training sample set containing a first class of training pictures and a second class of training pictures, the first class of training pictures being sensitive pictures which include private parts, the second class of training pictures being non-sensitive pictures which do not include private parts; and inputting the first class of training pictures and the second class of training pictures into an initial sensitive picture recognition model randomly, such that feature coefficients between hidden layer nodes in each hidden layer of the initial sensitive picture recognition model are trained to obtain the sensitive picture recognition model, the sensitive picture recognition model may have a better possibility of correctly identifying the picture to be processed.

Figure 4:
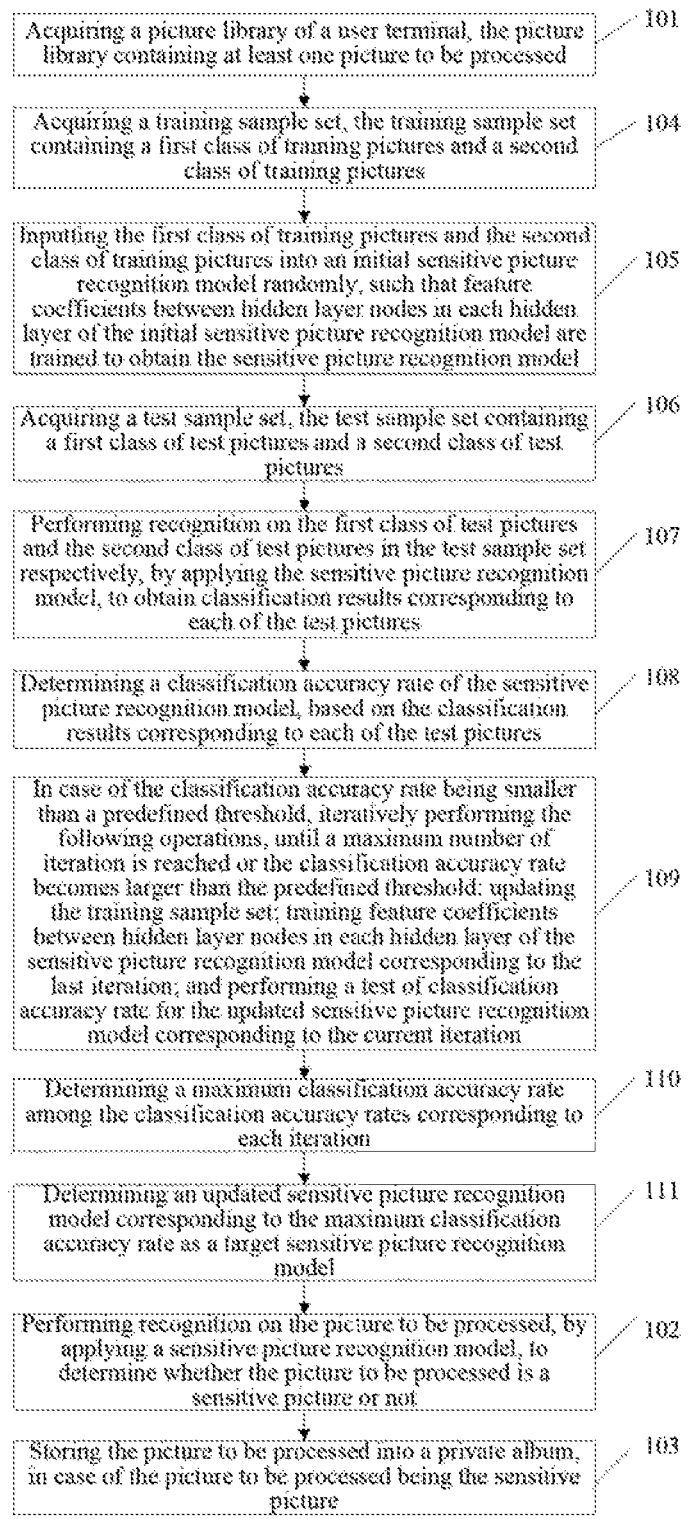
FIG. 4 is a flow diagram illustrating a method for sensitive picture recognition according to another exemplary embodiment.

After the training described in the above embodiments, the obtained sensitive picture recognition model may not have a classification accuracy rate that satisfies a predefined threshold. Thus, in order to make the classification accuracy rate of the sensitive picture recognition model satisfy the predefined threshold, after step 105, the server may also perform following steps (referring to FIG. 4):

In step 106, a test sample set is required, the test sample set containing a first class of test pictures and a second class of test pictures, the first class of test pictures being sensitive pictures which include private parts, the second class of test pictures being non-sensitive pictures which do not include private parts.

In an exemplary implementation, in order to improve test effects, a number of the first class of test pictures and a number of the second class of test pictures contained in the test sample set may be larger than a second predefined number. For example, the number of the first class of test pictures may be 20,000 or more, and the number of the second class of test pictures may be 30,000 or more.

In step 107, the sensitive picture recognition model is applied to perform recognition on the first class of test pictures and the second class of test pictures in the test sample set respectively, to obtain classification results corresponding to each of the test pictures.

In step 108, a classification accuracy rate of the sensitive picture recognition model is determined, based on the classification results corresponding to each of the test pictures.

In another exemplary implementation, if a classification result of a test picture is consistent with the attribute of the test picture, the classification is correct; otherwise, the classification is wrong. The classification accuracy rate of the sensitive picture recognition model is determined as a ratio of the number of test pictures having a correct classification result to the total number of the test pictures.

In step 109, in case of the classification accuracy rate being smaller than a predefined threshold, the following operations will be iteratively performed until a maximum number of iteration is reached or the classification accuracy rate becomes larger than the predefined threshold. The iteratively performed operations include: updating the training sample set; training feature coefficients between hidden layer nodes in each hidden layer of the sensitive picture recognition model corresponding to the last iteration, in accordance with the updated training sample set, to obtain an updated sensitive picture recognition model corresponding to the current iteration; and performing a test of classification accuracy rate for the updated sensitive picture recognition model corresponding to the current iteration, based on an updated test sample set, to determine a corresponding classification accuracy rate.

In step 110, a maximum classification accuracy rate is determined among the classification accuracy rates corresponding to each of the iterations.

In step 111, an updated sensitive picture recognition model corresponding to the maximum classification accuracy rate is determined as a target sensitive picture recognition model.

It is to be noted that, the first predefined number and the second predefined number, as described herein, may be obtained through a great deal of experimental analysis, and will not be elaborated herein.

In the present exemplary embodiment, with the steps of acquiring the test sample set, the test sample set containing a first class of test pictures and a second class of test pictures, the first class of test pictures being sensitive pictures which include private parts, the second class of test pictures being non-sensitive pictures which do not include private parts; performing recognition on the first class of test pictures and the second class of test pictures in the test sample set respectively, by applying the sensitive picture recognition model, to obtain a classification accuracy rate of the sensitive picture recognition model; in case of the classification accuracy rate being smaller than a predefined threshold, training feature coefficients between hidden layer nodes in each hidden layer of the sensitive picture recognition model corresponding to the last iteration in accordance with the updated training sample set, until a maximum number of iteration is reached or the classification accuracy rate becomes larger than the predefined threshold; determining a maximum classification accuracy rate among the classification accuracy rates corresponding to each of the iterations; and determining an updated sensitive picture recognition model corresponding to the maximum classification accuracy rate as a target sensitive picture recognition model, the classification accuracy rate of the sensitive picture recognition model may be improved, and thus the sensitive picture recognition model may have a better possibility of correctly identifying the picture to be processed.

Figure 5:
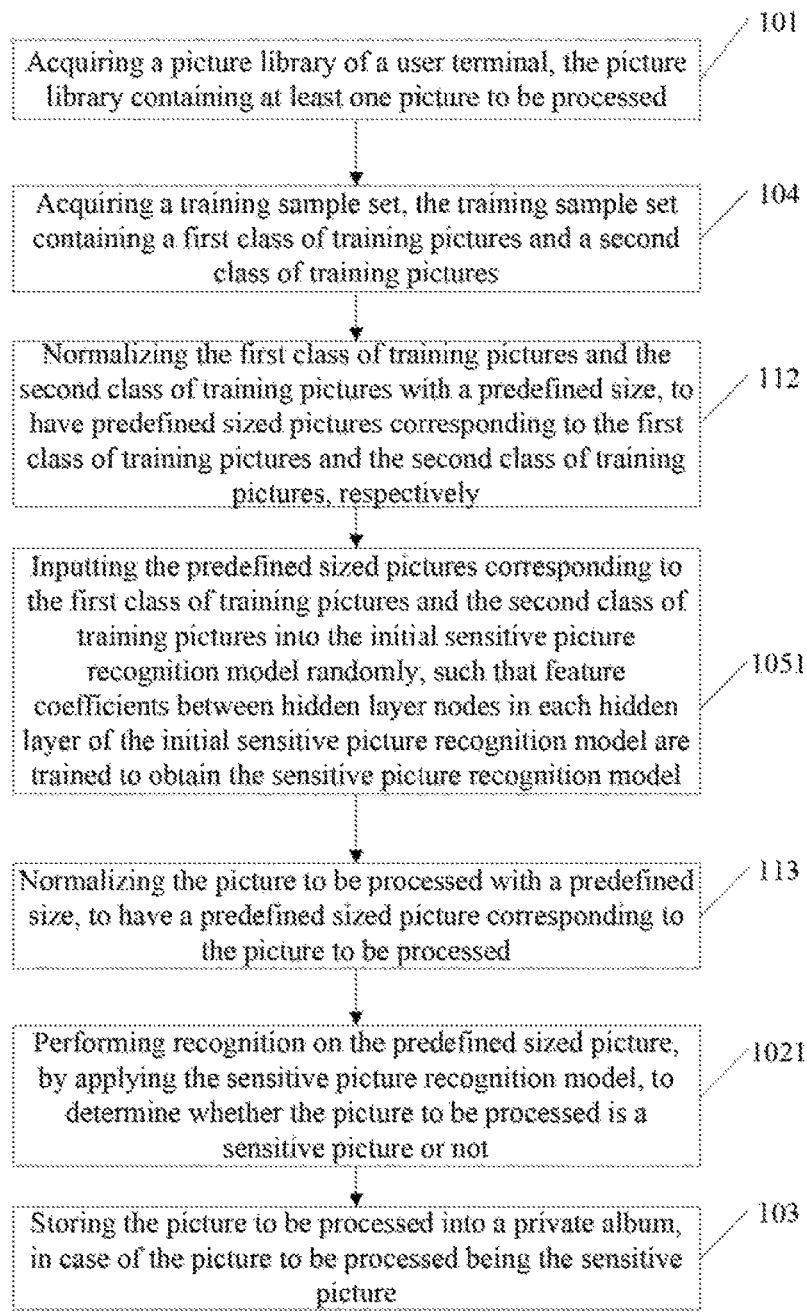
FIG. 5 is a flow diagram illustrating a method for sensitive picture recognition according to another exemplary embodiment.

FIG. 5 is a flow diagram illustrating a method for sensitive picture recognition according to another exemplary embodiment. As shown in FIG. 5, apart from these steps described in FIG. 3, the size of pictures inputted into the sensitive picture recognition model may be defined as a predefined size, so as to accelerate processing speed of the sensitive picture recognition model for the inputted pictures. Accordingly, before step 105, the method may further include the following steps.

In step 112, the first class of training pictures and the second class of training pictures are normalized with a predefined size, to have predefined sized pictures corresponding to the first class of training pictures and the second class of training pictures, respectively In an exemplary implementation, the server may define the predefined size as required, for example. For instance, the predefined size may be 224 pixels by 224 pixels.

It is to be noted that, before step 107, correspondingly, sizes of the first class of test pictures and the second class of test pictures may be similarly processed according to above described manner.

Subsequently, the step 105 may include step 1051: inputting predefined sized pictures corresponding to the first class of training pictures and the second class of training pictures into the initial sensitive picture recognition model randomly, such that feature coefficients between hidden layer nodes in each hidden layer of the initial sensitive picture recognition model are trained to obtain the sensitive picture recognition model.

Correspondingly, before step 102, the method may further include: in step 113, the picture to be processed is normalized with a predefined size, to have a predefined sized picture corresponding to the picture to be processed.

Accordingly, step 102 may include step 1021: performing recognition on the predefined sized picture, by applying the sensitive picture recognition model, to determine whether the picture to be processed is a sensitive picture or not.

Embodiments of the disclosure may provide the following beneficial effects. With the steps of normalizing the picture to be processed with a predefined size to have a predefined sized picture corresponding to the picture to be processed, applying the sensitive picture recognition model to perform recognition on the predefined sized picture so as to determine whether the picture to be processed is a sensitive picture or not, and storing the picture to be processed into a private album in case of the picture to be processed being the sensitive picture, the picture to be processed in the picture library may be automatically recognized and processed. Accordingly, there is no need for a user to manually select a sensitive picture and move the sensitive picture into the private album, and thus both time and labor are saved. Moreover, the recognition speed of the sensitive picture recognition model for the picture to be processed may be improved by the normalization operation for the picture to be processed. Furthermore, with the steps of respectively normalizing the first class of training pictures and the second class of training pictures with a predefined size to have predefined sized pictures corresponding to the first class of training pictures and the second class of training pictures, and inputting the predefined sized pictures corresponding to the first class of training pictures and the second class of training pictures into the initial sensitive picture recognition model randomly, such that feature coefficients between hidden layer nodes in each hidden layer of the initial sensitive picture recognition model may be trained, the processing speed of the initial sensitive picture recognition model for the inputted training pictures may be improved, and thus the training speed of the initial sensitive picture recognition model may be improved.

Figure 6:
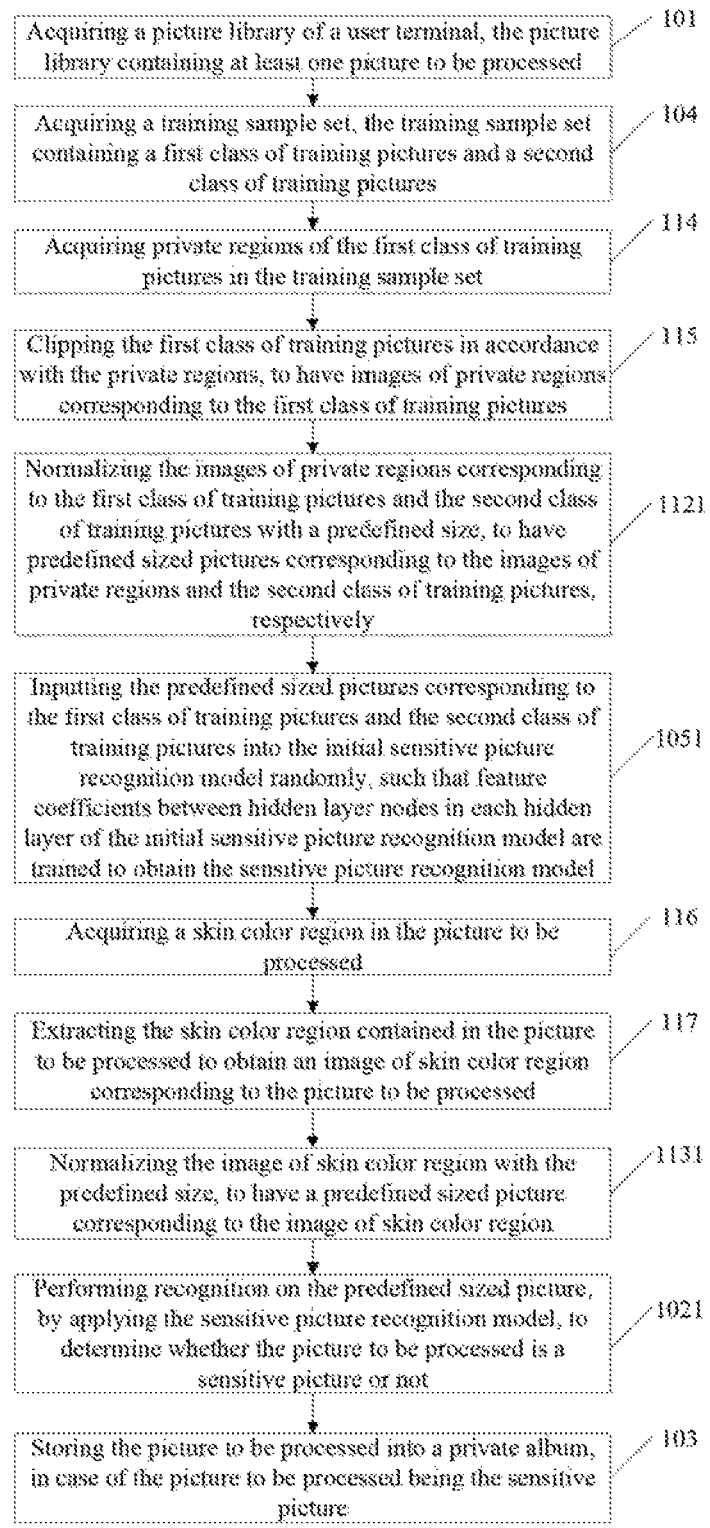
FIG. 6 is a flow diagram illustrating a method for sensitive picture recognition according to another exemplary embodiment.

FIG. 6 is a flow diagram illustrating a method for sensitive picture recognition according to another exemplary embodiment. As shown in FIG. 6, apart from these steps described in the exemplary embodiment of FIG. 5, before step 112, the method may further include the following steps.

In step 114, private regions of the first class of training pictures in the training sample set are required.

In step 115, in accordance with the private regions, the first class of training pictures are clipped to have images of private regions corresponding to the first class of training pictures.

Accordingly, the step 112 may include step 1121: normalizing the images of private regions corresponding to the first class of training pictures and the second class of training pictures with a predefined size, to have predefined sized pictures corresponding to the images of private regions and the second class of training pictures, respectively.

It is to be noted that, before step 107, correspondingly, sizes of the first class of test pictures and the second class of test pictures may be similarly clipped according to above described manner.

Subsequently, the method may further include: before step 113, acquiring a skin color region in the picture to be processed in step 116.

In an exemplary implementation, the process of acquiring the skin color region in the picture to be processed may include: performing recognition on the picture to be processed, by applying a skin color model, to decide whether the picture to be processed contains a skin color region, the ratio of R channel to G channel for the skin color region being larger than a predefined ratio; determining, in case of the picture to be processed containing a skin color region, whether the picture to be processed contains connectible skin color regions, based on positions of the skin color regions; and performing connectivity processing for the connectible skin color regions in the picture to be processed to obtain the skin color region, in case of the picture to be processed containing the connectible skin color regions, to obtain the skin color region of the picture to be processed.

Because of all kinds of influencing factors such as human blood and the like, the ratio of R channel to G channel for human skin is usually larger than a predefined ratio. Accordingly, in the exemplary implementation, a region, in which the ratio of R channel to G channel is larger than the predefined ratio, may be determined as the skin color region in the picture to be processed. More particular, the skin color model may be a model that enables the recognition of the skill color region, such as a Gaussian complexion model, etc. The present embodiment will not be limited in this respect, and the server may select any appropriate skin color model as required, for the recognition of the skin color region.

In another exemplary implementation, the connectible skin color region refers to a skin color region consisted of pixels having adjacent positions and a same value (Region, Blob) in the picture. Whether the picture to be processed contains any connective skin color region may be determined by the positions of the skin color regions and pixel analysis of each pixel in the skin color regions. Algorithms for region connectivity analysis for example, may be Two-Pass approach or Seed-Filling approach.

In this embodiment, the connectivity process may refer to: connecting the connective skin color regions with other regions in the picture that are placed between the connectible skin color regions, to have a connected skin color region.

In the present embodiment, with the steps of applying a skin color model to perform recognition on the picture to be processed so as to decide whether the picture to be processed contains a skin color region, the ratio of R channel to G channel for the skin color region being larger than a predefined ratio; performing connectivity processing for the connectible skin color regions in the picture to be processed and extracting the connected skin color region of the picture to be processed to obtain an image of skin color region corresponding to the picture to be processed; performing normalization and recognition on the image of skin color region corresponding to the picture to be processed to determine whether the picture to be processed is a sensitive picture or not; and storing the picture to be processed into a private album in case of the picture to be processed being the sensitive picture, a number of images of skin color regions that need to be identified may be reduced, and thus the efficiency of sensitive picture recognition may be improved.

In step 117, the skin color region contained in the picture to be processed is extracted to obtain an image of skin color region corresponding to the picture to be processed.

Accordingly, step 113 may include step 1131: normalizing the image of skin color region with the predefined size, to have a predefined sized picture corresponding to the image of skin color region.

In the above embodiments, with the steps of acquiring a skin color region in the picture to be processed, extracting the skin color region contained in the picture to be processed to obtain an image of skin color region corresponding to the picture to be processed, performing normalization and recognition on the image of skin color region corresponding to the picture to be processed so as to determine whether the picture to be processed is a sensitive picture or not, and storing the picture to be processed into a private album in case of the picture to be processed being the sensitive picture, the recognition in the picture to be processed may be less interfered by other regions except for the skin color region. Accordingly, the efficiency of sensitive picture recognition may be improved; the privacy protection may be enhanced; and leakage of sensitive picture may be avoided. Moreover, by clipping the first class of training pictures in accordance with the private regions to have images of private regions corresponding to the first class of training pictures, normalizing the images of private regions corresponding to the first class of training pictures and then inputting the normalized images into the initial sensitive picture recognition model, and training feature coefficients between hidden layer nodes in each hidden layer of the sensitive picture recognition model corresponding to the last iteration, the interference, with respect to the initial sensitive picture recognition model, which is caused by other regions except for the private regions in the first class of training pictures, may be avoided. Accordingly, the training speed of the sensitive picture recognition model may be improved, and thus the training efficiency of the sensitive picture recognition model may be improved.

The following embodiments are devices that may be used to perform the methods disclosed in the above embodiments of the disclosure. The methods above may be referred to for any undisclosed details of the devices of the following embodiments.

Figure 7:
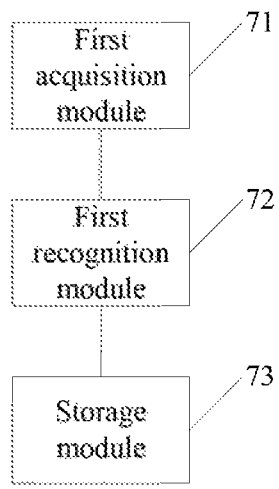
FIG. 7 is a block diagram illustrating a device for sensitive picture recognition according to an exemplary embodiment.

FIG. 7 is a block diagram illustrating a device for sensitive picture recognition according to an exemplary embodiment. The above methods may be performed by this device through software, hardware, or a combination thereof. This device may include: a first acquisition module 71, configured to acquire a picture library of a user terminal, the picture library containing at least one picture to be processed; a first recognition module 72, configured to perform recognition on the picture to be processed, by applying a sensitive picture recognition model, to determine whether the picture to be processed is a sensitive picture or not; and a storage module 73, configured to store the picture to be processed into a private album, in case of the picture to be processed being the sensitive picture.

In this example embodiment, the convolutional neural network is utilized to establish the sensitive picture recognition model. The convolutional neural network, as one kind of a variety of artificial neural networks, has become a hot area in current field of voice analysis and image recognition. Shared weights in the structure of the convolutional neural network make it more likely to be a biological neural network, reduce the complexity of the network model, and have a decreased number of weights. This advantage will be more outstanding when an input of the network is a multi-dimensional image. By taking the image as a direct input of the network, it may avoid complex feature extraction and data reconstruction processes as happened in traditional recognition algorithms A network structure of a convolutional neural network is shown in FIG. 2. The convolutional neural network is a multilayer neural network, in which each layer is consisted of multiple two-dimensional planes, and each plane is consisted of multiple independent neurons. In an exemplary implementation, suppose that a convolutional neural network based sensitive picture recognition model may have a N-layer structure, in which weight coefficients of connections between hidden layer nodes in every two adjacent layers are determined by a training sample set. For ease of illustration, the weight coefficients of the connections between hidden layer nodes are called as "feature coefficients" in the present disclosure. That is to say, the sensitive picture recognition model has feature coefficients of N layers.

In the present embodiment, by applying the sensitive picture recognition model to perform recognition on the picture to be processed so as to determine whether the picture to be processed is a sensitive picture or not, and storing the picture to be processed into the private album in case of the picture to be processed being the sensitive picture, the picture to be processed in the picture library may be automatically recognized and processed. Accordingly, there is no need for a user to manually select a sensitive picture and move the sensitive picture into the private album. As a result, both time and labor are saved; the efficiency of sensitive picture recognition may be improved; the privacy protection may be enhanced; and leakage of sensitive picture may be avoided.

Figure 8:
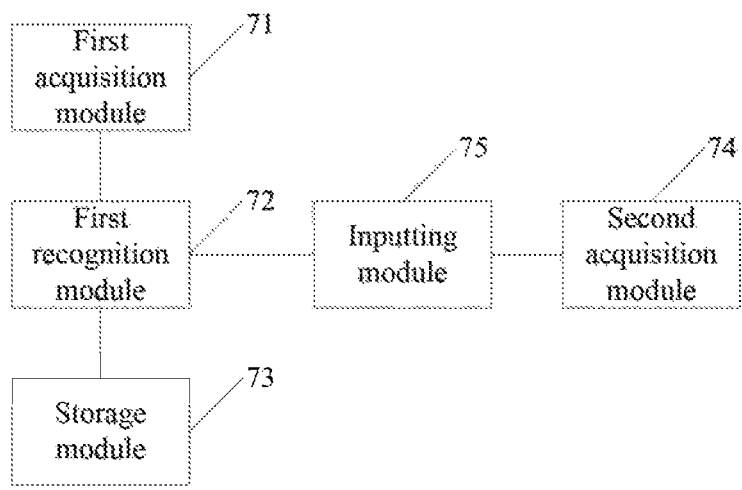
FIG. 8 is a block diagram illustrating a device for sensitive picture recognition according to another exemplary embodiment.

Further, referring to FIG. 8, the device may further include: a second acquisition module 74, configured to acquire a training sample set, the training sample set containing a first class of training pictures and a second class of training pictures, the first class of training pictures being sensitive pictures which include private parts, the second class of training pictures being non-sensitive pictures which do not include private parts; and an inputting module 75, configured to input the first class of training pictures and the second class of training pictures into an initial sensitive picture recognition model randomly, such that feature coefficients between hidden layer nodes in each hidden layer of the initial sensitive picture recognition model are trained to obtain the sensitive picture recognition model.

In an exemplary implementation, the first class of training pictures and the second class of training pictures may be collected by the server. For the purpose of ensuring certain training effects, both a number of the first class of training pictures and a number of the second class of training pictures in the training sample set may be larger than a first predefined number. For example, the number of the first class of training pictures may be 200,000 or more, and the number of the second class of training pictures may be 300,000 or more.

In a possible implementation, the server may randomly input each training picture into the initial sensitive picture recognition model, and compare the attribute classification result outputted by the initial sensitive picture recognition model with the attribute of the inputted training picture to determine whether any feature coefficient between hidden layer nodes in each hidden layer of the current initial sensitive picture recognition model is required to be adjusted. However, this kind of training method may have such a problem: just after a forward adjustment of the feature coefficients between hidden layer nodes in each hidden layer of the initial sensitive picture recognition model according to a former training picture, it is possible to adjust inversely the feature coefficients between hidden layer nodes in each hidden layer of the initial sensitive picture recognition model according to a subsequent training picture. Consequently, the feature coefficients between hidden layer nodes in each hidden layer of the initial sensitive picture recognition model may be frequently and repeatedly adjusted.

Regarding this, in an alternative embodiment, the server may input a batch of training pictures into the initial sensitive picture recognition model in a proper sequence, and then determine whether any feature coefficient between hidden layer nodes in each hidden layer of the current initial sensitive picture recognition model is required to be adjusted, based on the attribute classification results of this batch of training pictures outputted by the initial sensitive picture recognition model. After this, the next batch of training pictures will be inputted into the initial sensitive picture recognition model in a proper sequence.

In this exemplary embodiment, with the steps of acquiring a training sample set, the training sample set containing a first class of training pictures and a second class of training pictures, the first class of training pictures being sensitive pictures which include private parts, the second class of training pictures being non-sensitive pictures which do not include private parts, and inputting the first class of training pictures and the second class of training pictures into an initial sensitive picture recognition model randomly, such that feature coefficients between hidden layer nodes in each hidden layer of the initial sensitive picture recognition model are trained to obtain the sensitive picture recognition model, the sensitive picture recognition model may have a better possibility of correctly identifying the picture to be processed.

Figure 9:
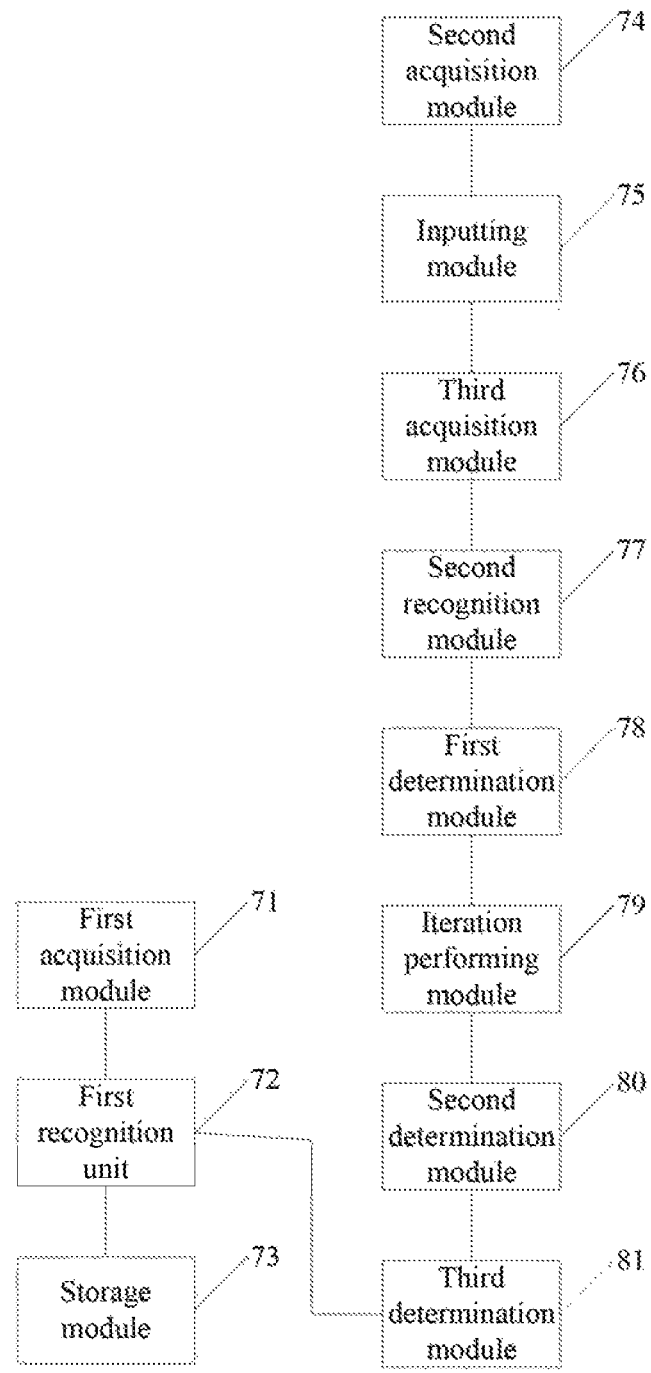
FIG. 9 is a block diagram illustrating a device for sensitive picture recognition according to another exemplary embodiment.

Further, referring to FIG. 9, the device may further include: a third acquisition module 76, configured to acquire a test sample set, the test sample set containing a first class of test pictures and a second class of test pictures, the first class of test pictures being sensitive pictures which include private parts, the second class of test pictures being non-sensitive pictures which do not include private parts; a second recognition module 77, configured to perform recognition on the first class of test pictures and the second class of test pictures in the test sample set respectively, by applying the sensitive picture recognition model, to obtain classification results corresponding to each of the test pictures; and a first determination module 78, configured to determine a classification accuracy rate of the sensitive picture recognition model, based on the classification results corresponding to each of the test pictures.

The device may also include an iteration performing module 79, configured to iteratively perform the following operations, in case of the classification accuracy rate being smaller than a predefined threshold, until a maximum number of iteration is reached or the classification accuracy rate becomes larger than the predefined threshold: updating the training sample set; training feature coefficients between hidden layer nodes in each hidden layer of the sensitive picture recognition model corresponding to the last iteration, in accordance with the updated training sample set, to obtain an updated sensitive picture recognition model corresponding to the current iteration; and performing a test of classification accuracy rate for the updated sensitive picture recognition model corresponding to the current iteration, based on an updated test sample set, to determine a corresponding classification accuracy rate.

Moreover, the device of FIG. 9 may also include: a second determination module 80, configured to determine a maximum classification accuracy rate among the classification accuracy rates corresponding to each of the iterations; and a third determination module 81, configured to determine an updated sensitive picture recognition model corresponding to the maximum classification accuracy rate as a target sensitive picture recognition model.

In an exemplary implementation, in order to improve test effects, a number of the first class of test pictures and a number of the second class of test pictures contained in the test sample set may be larger than a second predefined number. For example, the number of the first class of test pictures may be 20,000 or more, and the number of the second class of test pictures may be 30,000 or more.

In the present exemplary embodiment, with the steps of acquiring the test sample set, the test sample set containing a first class of test pictures and a second class of test pictures, the first class of test pictures being sensitive pictures which include private parts, the second class of test pictures being non-sensitive pictures which do not include private parts; performing recognition on the first class of test pictures and the second class of test pictures in the test sample set respectively, by applying the sensitive picture recognition model, to obtain a classification accuracy rate of the sensitive picture recognition model; in case of the classification accuracy rate being smaller than a predefined threshold, training feature coefficients between hidden layer nodes in each hidden layer of the sensitive picture recognition model corresponding to the last iteration in accordance with the updated training sample set, until a maximum number of iteration is reached or the classification accuracy rate becomes larger than the predefined threshold; determining a maximum classification accuracy rate among the classification accuracy rates corresponding to each of the iterations; and determining an updated sensitive picture recognition model corresponding to the maximum classification accuracy rate as a target sensitive picture recognition model, the classification accuracy rate of the sensitive picture recognition model may be improved, and thus the sensitive picture recognition model may have a better possibility of correctly identifying the picture to be processed.

Figure 10:
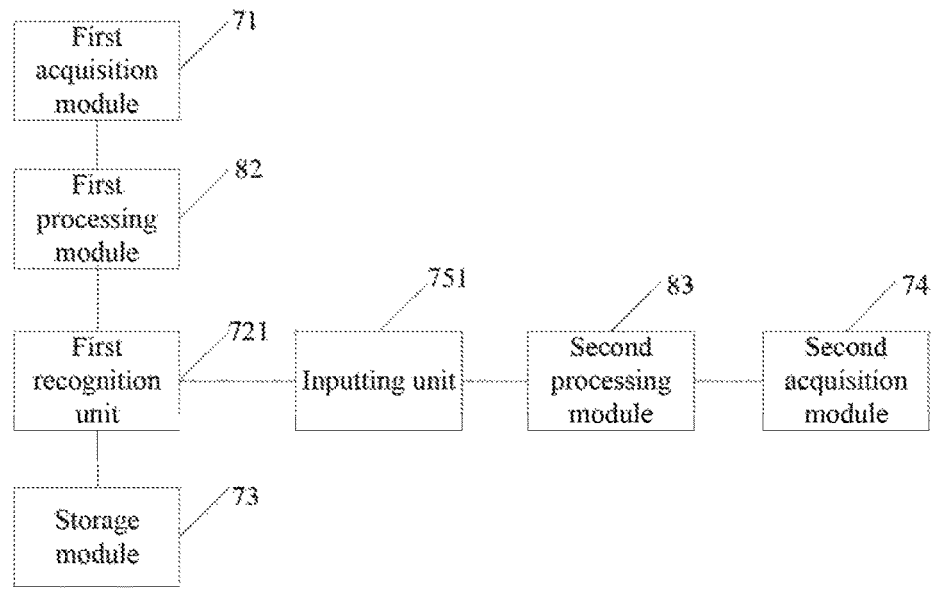
FIG. 10 is a block diagram illustrating a device for sensitive picture recognition according to another exemplary embodiment.

Further, referring to FIG. 10, apart from the modules described in the exemplary embodiment shown in FIG. 8, the device may further include a first processing module 82, which is configured to normalize the picture to be processed with a predefined size, to have a predefined sized picture corresponding to the picture to be processed.

Accordingly, the first recognition module 72 may include a first recognition unit 721, which is configured to perform recognition on the predefined sized picture, by applying the sensitive picture recognition model, to determine whether the picture to be processed is a sensitive picture or not.

Correspondingly, the device may also include a second processing module 83, which is configured to normalize the first class of training pictures and the second class of training pictures with a predefined size, to have predefined sized pictures corresponding to the first class of training pictures and the second class of training pictures, respectively.

Accordingly, the inputting module 75 may include an inputting unit 751, which is configured to input the predefined sized pictures corresponding to the first class of training pictures and the second class of training pictures into the initial sensitive picture recognition model randomly, such that feature coefficients between hidden layer nodes in each hidden layer of the initial sensitive picture recognition model are trained to obtain the sensitive picture recognition model.

According to the present exemplary embodiment, with the steps of normalizing the picture to be processed with a predefined size to have a predefined sized picture corresponding to the picture to be processed, applying the sensitive picture recognition model to perform recognition on the predefined sized picture so as to determine whether the picture to be processed is a sensitive picture or not, and storing the picture to be processed into a private album in case of the picture to be processed being the sensitive picture, the picture to be processed in the picture library may be automatically recognized and processed. Accordingly, there is no need for a user to manually select a sensitive picture and move the sensitive picture into the private album, and thus both time and labor are saved. Moreover, the recognition speed of the sensitive picture recognition model for the picture to be processed may be improved by the normalization operation for the picture to be processed. Furthermore, with the steps of respectively normalizing the first class of training pictures and the second class of training pictures with a predefined size to have predefined sized pictures corresponding to the first class of training pictures and the second class of training pictures, and inputting the predefined sized pictures corresponding to the first class of training pictures and the second class of training pictures into the initial sensitive picture recognition model randomly, such that feature coefficients between hidden layer nodes in each hidden layer of the initial sensitive picture recognition model may be trained, the processing speed of the initial sensitive picture recognition model for the inputted training pictures may be unproved, and thus the training speed of the initial sensitive picture recognition model may be improved.

Figure 11:
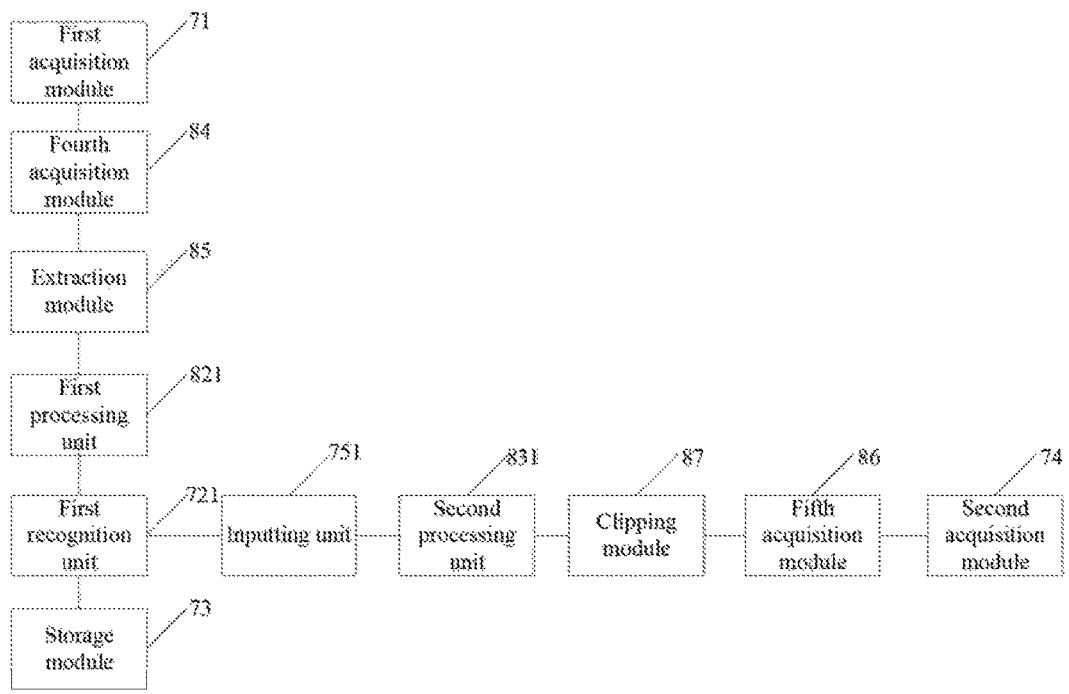
FIG. 11 is a block diagram illustrating a device for sensitive picture recognition according to another exemplary embodiment.

Further, referring to FIG. 11, apart from the modules described in the exemplary embodiment shown in FIG. 10, the device may further include: a fourth acquisition module 84, configured to acquire a skin color region in the picture to be processed; and an extraction module 85, configured to extract the skin color region contained in the picture to be processed to obtain an image of skin color region corresponding to the picture to be processed.

Accordingly, the first processing module 82 may include a first processing unit 821, which is configured to normalize the image of skin color region with the predefined size, to have a predefined sized picture corresponding to the image of skin color region.

Correspondingly, the device may also include: a fifth acquisition module 86, configured to acquire private regions of the first class of training pictures in the training sample set; and a clipping module 87, which is configured to clip the first class of training pictures in accordance with the private regions, to have images of private regions corresponding to the first class of training pictures.

Accordingly, the second processing module 83 may include a second processing unit 831, which is configured to normalize the images of private regions corresponding to the first class of training pictures and the second class of training pictures with a predefined size, to have predefined sized pictures corresponding to the images of private regions and the second class of training pictures, respectively.

In the above embodiments, with the steps of acquiring a skin color region in the picture to be processed, extracting the skin color region contained in the picture to be processed to obtain an image of skin color region corresponding to the picture to be processed, performing normalization and recognition on the image of skin color region corresponding to the picture to be processed so as to determine whether the picture to be processed is a sensitive picture or not, and storing the picture to be processed into a private album in case of the picture to be processed being the sensitive picture, the recognition in the picture to be processed may be less interfered by other regions except for the skin color region. Accordingly, the efficiency of sensitive picture recognition may be improved; the privacy protection may be enhanced; and leakage of sensitive picture may be avoided. Moreover, by clipping the first class of training pictures in accordance with the private regions to have images of private regions corresponding to the first class of training pictures, normalizing the images of private regions corresponding to the first class of training pictures and then inputting the normalized images into the initial sensitive picture recognition model, and training feature coefficients between hidden layer nodes in each hidden layer of the sensitive picture recognition model corresponding to the last iteration, the interference, with respect to the initial sensitive picture recognition model, which is caused by other regions except for the private regions in the first class of training pictures, may be avoided. Accordingly, the training speed of the sensitive picture recognition model may be improved, and thus the training efficiency of the sensitive picture recognition model may be improved.

Figure 12:
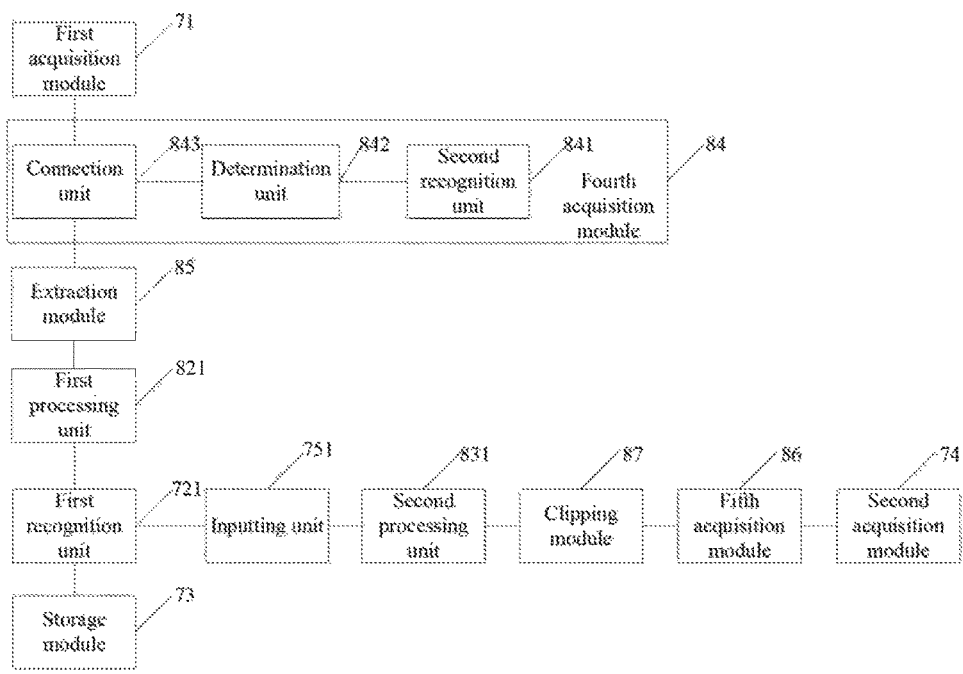
FIG. 12 is a block diagram illustrating a device for sensitive picture recognition according to another exemplary embodiment.

Referring to FIG. 12, apart from the modules described in the exemplary embodiment shown in FIG. 11, the fourth acquisition module 84 may include: a second recognition unit 841, which is configured to perform recognition on the picture to be processed, by applying a skin color model, to decide whether the picture to be processed contains a skin color region, the ratio of R channel to G channel for the skin color region being larger than a predefined ratio; a determination unit 842, which is configured to determine, in case of the picture to be processed containing the skin color region, whether the picture to be processed contains connectible skin color regions, based on positions of the skin color regions; and a connection unit 843, which is configured to perform connectivity processing for the connectible skin color regions in the picture to be processed to obtain the skin color region, in case of the picture to be processed containing the connectible skin color regions.

Because of all kinds of influencing factors such as human blood and the like, the ratio of R channel to G channel for human skin is usually larger than a predefined ratio. Accordingly, in the exemplary implementation, a region, in which the ratio of R channel to G channel is larger than the predefined ratio, may be determined as the skin color region in the picture to be processed.

More particular, the skin color model may be a model that enables the recognition of the skill color region, such as a Gaussian complexion model, etc. The present embodiment will not be limited in this respect, and the server may select any appropriate skin color model as required, for the recognition of the skin color region.

In the present embodiment, with the steps of applying a skin color model to perform recognition on the picture to be processed so as to decide whether the picture to be processed contains a skin color region, the ratio of R channel to G channel for the skin color region being larger than a predefined ratio; performing connectivity processing for the connectible skin color regions in the picture to be processed and extracting the connected skin color region of the picture to be processed to obtain an image of skin color region corresponding to the picture to be processed; performing normalization and recognition on the image of skin color region corresponding to the picture to be processed to determine whether the picture to be processed is a sensitive picture or not; and storing the picture to be processed into a private album in case of the picture to be processed being the sensitive picture, a number of images of skin color regions that need to be identified may be reduced, and thus the efficiency of sensitive picture recognition may be improved.

It is noted that the various modules and units in the present disclosure can be implemented using any suitable technology. In an example, a module can be implemented using integrated circuit (IC). In another example, a module can be implemented as a processing circuit executing software instructions.

With respect to the devices in the above embodiments, the specific manners for performing operations for individual modules therein have been described in detail in the embodiments regarding the methods for sensitive picture recognition, which will not be elaborated herein.

Figure 13:
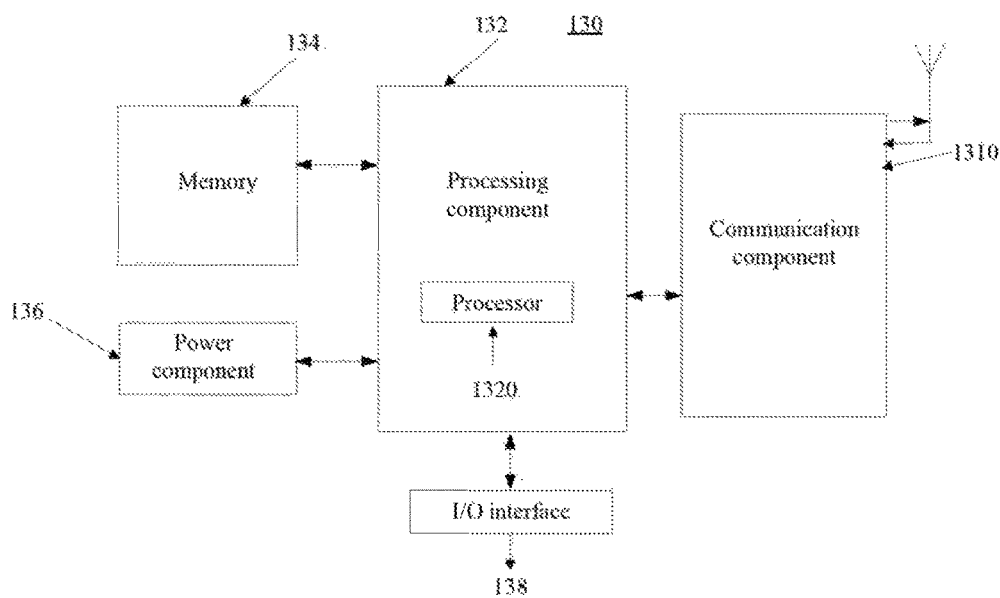
FIG. 13 is a block diagram illustrating a server according to an exemplary embodiment.

FIG. 13 is a block diagram illustrating a server according to an exemplary embodiment. Referring to FIG. 13, the server 130 may include one or more of the following components: a processing component 132, a memory 134, a power component 136, an input/output (I/O) interface 138, and a communication component 1310.

The processing component 132 typically controls overall operations of the server 130. Specifically, the processing component 132 may be configured to: acquire a picture library of a user terminal, the picture library containing at least one picture to be processed; perform recognition on the picture to be processed, by applying a sensitive picture recognition model, to determine whether the picture to be processed is a sensitive picture or not; and store the picture to be processed into a private album, in case of the picture to be processed being the sensitive picture.

The processing component 132 may include one or more processors 1320 to execute instructions to perform all or part of the steps in the above described methods. Moreover, the processing component 132 may include one or more modules which facilitate the interaction between the processing component 132 and other components. For instance, the processing component 132 may include a communication module to facilitate the interaction between the communication component 1310 and the processing component 132.

The memory 134 is configured to store various types of data and executable instructions of the processing component 132 to support the operation of the server 130. Examples of such data include instructions for any applications or methods operated on the server 130, contact data, phonebook data, messages, pictures, video, etc. The memory 134 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 136 provides power to various components of the server 130. The power component 136 may include a power management system, one or more power sources, and any other components associated with the generation, management, and distribution of power in the server 130.

The I/O interface 138 provides an interface between the processing component 132 and peripheral interface modules, such as a keyboard, a click wheel, buttons, and the like. The communication component 1310 is configured to facilitate communication, wired or wirelessly, between the server 130 and other devices. The server 130 can access a wireless network based on a communication standard, such as WiFi, 2G, or 3G, or a combination thereof. In one exemplary embodiment, the communication component 1310 receives a broadcast signal or broadcast associated information from an external broadcast management system via a broadcast channel. In one exemplary embodiment, the communication component 1310 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the server 130 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for sensitive picture recognition.

In exemplary embodiments, there is also provided a non-transitory computer-readable storage medium including instructions, such as included in the memory 134, executable by the processor 1320 in the server 130, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of server 130, causes the server 130 to perform the above described methods for sensitive picture recognition.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and embodiments are merely considered to be exemplary and the substantive scope and spirit of the disclosure is limited only by the appended claims.

It will be appreciated that the inventive concept is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for sensitive picture recognition, comprising:
receiving a picture to be processed from a picture library associated with a user account;
determining a sensitive picture recognition model by:
    receiving a training sample set, the training sample set containing a first class of training pictures and a second class of training pictures, the first class of training pictures being sensitive pictures which include private parts, the second class of training pictures being non-sensitive pictures which do not include any private parts;
    initializing a training model with multiple layers according to a neural network, each layer including neuron nodes with feature coefficients between the neuron nodes; and
    training the feature coefficients between the neuron nodes in each layer of the training model using the first class of training pictures and the second class of training pictures to determine a trained model for sensitive picture recognition;
detecting a portion of the picture that corresponds to human skin by:
    applying a skin color model to the picture, to decide whether the picture contains regions of skin, wherein the skin color model defines a skin color space in which a ratio of R channel to G channel is larger than a predefined ratio;
    determining, when the picture contains the regions of skin, whether the regions of skin are connectible based on positions of the regions; and
    when two regions of skin are connectible, connecting the two regions to form a combined region;
cropping the picture to obtain an image of the portion;
normalizing the image of the portion to have a predefined size;
applying the sensitive picture recognition model to the normalized image of the portion to determine whether the picture is a sensitive picture or not; and
providing a privacy protection associated with the user account to the picture when the picture is the sensitive picture.

2. The method of claim 1, further comprising:
receiving a test sample set, the test sample set containing a first class of test pictures and a second class of test pictures, the first class of test pictures being sensitive pictures which include sensitive contents, the second class of test pictures being non-sensitive pictures which do not include sensitive contents;
applying the trained model to each of the first class of test pictures and the second class of test pictures in the test sample set respectively, to obtain classification results corresponding to each of the test pictures; and
determining a classification accuracy rate of the trained model, based on the classification results corresponding to each of the test pictures.

3. The method of claim 2, wherein when the classification accuracy rate is smaller than a predefined threshold, the method comprises:
   updating the training sample set;
   training the feature coefficients between the neuron nodes in each layer of the trained model using the updated training sample set to update the trained model;
   updating the test sample set; and
   testing the updated trained model based on the updated test sample set to determine an updated classification accuracy rate.

4. The method of claim 3, further comprising:
   iteratively updating the trained model when the classification accuracy rate is smaller than the predefined threshold until a maximum iteration number is satisfied;
   selecting a maximum classification accuracy rate among the classification accuracy rates corresponding to each of the iterations; and
   determining the updated trained model corresponding to the maximum classification accuracy rate as the sensitive picture recognition model.

5. The method of claim 1, further comprising:
   normalizing the picture to have a predefined size; and
   applying the sensitive picture recognition model to the normalized picture to determine whether the picture is the sensitive picture or not.

6. The method of claim 1, further comprising:
   normalizing the first class of training pictures and the second class of training pictures to have a predefined size respectively; and
   training the feature coefficients between the neuron nodes in each layer of the training model using the normalized first class of training pictures and the normalized second class of training pictures to determine the trained model for sensitive picture recognition.

7. The method of claim 6, wherein normalizing the first class of training pictures and the second class of training pictures to have the predefined size respectively further comprises:
   receiving information indicative of sensitive regions in each picture of the first class of training pictures in the training sample set, the sensitive regions being under privacy protection;
   cropping the first class of training pictures in accordance with the sensitive regions, to have images of sensitive regions; and
   normalizing the images of sensitive regions and the second class of training pictures to have the predefined size.

8. A device for sensitive picture recognition, comprising:
   a processor; and
   a memory for storing instructions executable by the processor,
   wherein the processor is configured to:
      receive a picture to be processed from a picture library associated with a user account;
      determine a sensitive picture recognition model by:
         receiving a training sample set, the training sample set containing a first class of training pictures and a second class of training pictures, the first class of training pictures being sensitive pictures which include private parts, the second class of training pictures being non-sensitive pictures which do not include any private parts;
         initializing a training model with multiple layers according to a neural network, each layer including neuron nodes with feature coefficients initialized between the neuron nodes; and
         training the feature coefficients between the neuron nodes in each layer of the training model using the first class of training pictures and the second class of training pictures to determine a trained model for sensitive picture recognition;
      detect a portion of the picture that corresponds to human skin by:
         applying a skin color model to the picture, to decide whether the picture contains regions of skin, wherein the skin color model defines a skin color space in which a ratio of R channel to G channel is larger than a predefined ratio;
         determining, when the picture contains the regions of skin, whether the regions of skin are connectible based on positions of the regions; and
         when two regions of skin are connectible, connecting the two regions to form a combined region;
      crop the picture to obtain an image of the portion;
      normalize the image of the portion to have a predefined size;
      apply the sensitive picture recognition model to the normalized image of the portion to determine whether the picture is a sensitive picture or not; and
      provide a privacy protection associated with the user account to the picture when the picture is the sensitive picture.

9. The device of claim 8, wherein the processor is further configured to:
   receive a test sample set, the test sample set containing a first class of test pictures and a second class of test pictures, the first class of test pictures being sensitive pictures which include sensitive contents, the second class of test pictures being non-sensitive pictures which do not include sensitive contents;
   apply the trained model to each of the first class of test pictures and the second class of test pictures in the test sample set respectively, to obtain classification results corresponding to each of the test pictures; and
   determine a classification accuracy rate of the trained model, based on the classification results corresponding to each of the test pictures.

10. The device of claim 9, wherein the processor is further configured to:
   update the training sample set;
   train the feature coefficients between the neuron nodes in each layer of the trained model using the updated training sample set to update the trained model;
   update the test sample set; and
   test the updated trained model based on the updated test sample set to determine an updated classification accuracy rate.

11. The device of claim 8, wherein the processor is further configured to:
   normalize the picture to have a predefined size; and
   apply the sensitive picture recognition model to the normalized picture to determine whether the picture is the sensitive picture or not.

12. The device of claim 8, wherein the processor is further configured to:
   normalize the first class of training pictures and the second class of training pictures to have a predefined size respectively; and
   train the feature coefficients between the neuron nodes in each layer of the training model using the normalized first class of training pictures and the normalized second class of training pictures to determine the trained model for sensitive picture recognition.

13. The device of claim 12, wherein the processor is further configured to:
   receive information indicative of sensitive regions in each picture of the first class of training pictures in the training sample set, the sensitive regions being under privacy protection;
   crop the first class of training pictures in accordance with the sensitive regions, to have images of sensitive regions; and
   normalize the images of sensitive regions and the second class of training pictures to have the predefined size.

14. A non-transitory computer-readable storage medium having stored therein instructions that, when executed by a processor of a device, cause the device to perform operations for sensitive picture recognition, the operations comprising:
   receiving a picture to be processed from a picture library associated with a user account;
   determining a sensitive picture recognition model by:
      receiving a training sample set, the training sample set containing a first class of training pictures and a second class of training pictures, the first class of training pictures being sensitive pictures which include private parts, the second class of training pictures being non-sensitive pictures which do not include any private parts;
      initializing a training model with multiple layers according to a neural network, each layer including neuron nodes with feature coefficients between the neuron nodes; and
      training the feature coefficients between the neuron nodes in each layer of the training model using the first class of training pictures and the second class of training pictures to determine a trained model for sensitive picture recognition;
   detecting a portion of the picture that corresponds to human skin by:
      applying a skin color model to the picture, to decide whether the picture contains regions of skin, wherein the skin color model defines a skin color space in which a ratio of R channel to G channel is larger than a predefined ratio;
      determining, when the picture contains the regions of skin, whether the regions of skin are connectible based on positions of the regions; and
      when two regions of skin are connectible, connecting the two regions to form a combined region;
   cropping the picture to obtain an image of the portion;
   normalizing the image of the portion to have a predefined size;
   applying the sensitive picture recognition model to the normalized image of the portion to determine whether the picture is a sensitive picture or not; and
   providing a privacy protection associated with the user account to the picture when the picture is the sensitive picture.

* * * * *